(12) United States Patent
Sephton

(10) Patent No.: US 6,254,734 B1
(45) Date of Patent: Jul. 3, 2001

(54) BAROMETRIC EVAPORATION PROCESS AND EVAPORATOR

(76) Inventor: Hugo H Sephton, 120 York Ave., Kensington, CA (US) 94708

( * ) Notice: Subject to any disclaimer, the term of this patent is extended or adjusted under 35 U.S.C. 154(b) by 0 days.

(21) Appl. No.: 09/161,565

(22) Filed: Sep. 28, 1998

Related U.S. Application Data

(63) Continuation-in-part of application No. 08/880,250, filed on Jun. 23, 1997, now Pat. No. 5,968,312, which is a continuation-in-part of application No. 08/405,170, filed on Mar. 14, 1995, now abandoned, and a continuation-in-part of application No. 08/726,126, filed on Oct. 4, 1996, now Pat. No. 5,853,549.

(51) Int. Cl.$^7$ ..................................................... B01D 3/42
(52) U.S. Cl. ............................. 203/2; 203/6; 203/11; 203/40; 203/20; 203/80; 203/88; 203/DIG. 20; 203/DIG. 17; 203/100; 159/2.3; 159/31; 159/47.1; 159/DIG. 16
(58) Field of Search ......................... 203/40, 6, 88, 203/2, 91, 11, DIG. 17, DIG. 20, 10, 100, 20, 80; 159/47.1, 31, 2.1, 2.3, DIG. 16, DIG. 4, 6.1; 60/648; 202/197, 205; 210/744

(56) References Cited

U.S. PATENT DOCUMENTS

| | | | | |
|---|---|---|---|---|
| 3,073,380 | * | 1/1963 | Palmason | 159/49 |
| 3,965,005 | * | 6/1976 | Boyd, Jr. et al. | 159/31 |
| 3,974,023 | * | 8/1976 | Bowers | 159/6.1 |
| 4,319,965 | * | 3/1982 | Parker | 203/11 |
| 4,329,198 | * | 5/1982 | Standiford | 159/6.1 |
| 4,349,068 | * | 9/1982 | Courg | 165/104.27 |
| 4,366,030 | * | 12/1982 | Anderson | 203/11 |
| 4,375,386 | * | 3/1983 | Windham | 202/197 |
| 4,511,432 | * | 4/1985 | Sephton | 159/47.1 |
| 4,636,283 | * | 1/1987 | Nasser | 202/197 |
| 4,950,363 | * | 8/1990 | Silvery | 203/88 |
| 5,156,706 | * | 10/1992 | Sephton | 159/DIG. 16 |

* cited by examiner

Primary Examiner—Virginia Manoharan

(57) ABSTRACT

A process for the evaporation of an available warm or hot liquid under a vacuum by applying a pressure drop thereon initiating flash-down evaporation, and followed by further flash-down evaporation under an applied pressure gradient whereby the residual liquid is raised by the vapor produced to an elevation sufficient for subsequently discharging the residual liquid from vacuum without a pump; and by separating the vapor phase from the residual liquid phase before condensing the vapor produced into distilled liquid.

7 Claims, 2 Drawing Sheets

BAROMETRIC EVAPORATION PROCESS AND EVAPORATOR

This is a continuation in part application (CIP) of U.S. pantent application Ser. No. 08/880,250 filed Jun. 23, 1997 and now U.S. Pat. No. 5,968,312 which is a CIP of my Ser. No. 08/405,170 filed Mar. 14, 1995 now abandoned and which is about an adjustable orifice plate for flow control of an evaporating liquid cascading downward through multiple-effect evaporators. The present application is also a CIP of my U.S. patent application Ser. No. 08/726,126 filed Oct. 4, 1996 and now U.S. Pat. No. 5,853,549 which is about the desalination of seawater by evaporation in a multi-stack array of vertical tube bundles with waste heat or heat of low value driving evaporation.

BACKGROUND OF THE INVENTION (1) Field of the Invention

This invention relates to the use of solar energy captured with a solar pond in a warmed brine layer therein, and it also relates to the use of energy recovered by flash-down evaporation from warmed or hot coolant water rejected as waste heat to the environment by power plants, industrial thermal processes, internal combustion engines, and available heat energy contained in liquids. Such energy is also known as latent heat evaporation or of flash-down evaporation. In either case, heat contained in solar heated brine or in another liquid such as an industrial coolant, is converted into steam or vapor having a temperature generally below about 200° F. and above 100° F., but also applicable outside this range, by recovering this heat or part thereof in the form of low pressure steam or vapor by flash-down of the liquid under a vacuum or a partial vacuum. The barometric evaporator provides or improves a process or apparatus, or a procedure to recover such heat, or waste heat, from a warm or hot liquid or brine with a high thermal efficiency, and it also includes use of such steam or vapor for example in desalination or purification of wastewater or seawater, to produce a distilled water product, or for the recovery of energy therefrom e.g. to drive a turbine, or to lift or elevate a liquid phase and to use this lifting effect to provide for subsequent removal of a liquid by gravity from a vessel under vacuum or to discharge it into a pond without using a pump or for recycling it to the heat producing source. This process or method is applied in several related procedures whereby a range of distillate gains is achieved with a range of designs including an evaporator or heat exchanger or a condenser. The steam or vapor produced by flash-down is subsequently condensed into distillate in a heat exchanger, an evaporator or a condenser. The vapor's heat of condensation thus liberated may be used in a single effect vertical tube evaporator (VTE) or in a multi-effect (ME) series of vertical tube evaporators (ME-VTE) to increase the distillate product, or to increase the gain ratio of distillate produced to steam used. Substantial additional flash-down of the original hot liquid may be applied in or immediately prior to each evaporation step in such a ME-VTE series, to thus increase significantly the thermal flux and the amount of heating steam applied in each next step of such a step-wise series of evaporators, and to increase the distillate capacity per effect. This increase in thermal flux effect-to-effect in part distinguishes this ME-VTE series from a conventional multi-effect series of vertical tube evaporators.

(2) Description of the Prior Art

In the multi-stage flash evaporation (MSF) process for the desalination of seawater or its brine concentrate, the feed is first preheated stage-to-stage with vapor and then with steam to a high temperature of up to about 220° F., and the feed is then flashed-down horizontally stage-wise to lower temperatures stage-to-stage as the residual brine concentrate passes through inter-stage gates to the reduced pressures maintained in the series of stages, and by releasing vapors that preheat the feed. The lowest stage temperature depends on the coolant used, and is usually close to and above the coolant temperature. The number of stages applied may vary, usually within a range of 16 to 90, and the flash-down range is usually only a few degrees, up to about 5° F. Each stage is typically an rectangular vessel, and one of an in-line series by subdividing an elongated horizontal vessel into separate stages with submerged brine flash-down gates dividing these stages. The vapor produced by flash-down is condensed on a horizontal bundle of heat exchanger tubes extending through the stages conducting the feed liquid or seawater being gradually heated stage-to-stage as it passes counter-current to the direction of flash-down brine flow. This feed is then further heated with steam (e.g. to 220° F.) in a feed heater before it is turned around and enters the first flash-down stage in the MSF series and flashes down while cooling the residual brine stage-to-stage. In this process the stages are usually in a horizontal series, and the final brine concentrate as well as the accumulated condensates or distillates are pumped out from the vacuum maintained in the last stage and discharged at ambient pressure or above it.

In conventional multi-effect (ME) upflow or downflow vertical tube evaporation (VTE) of seawater or brine; the evaporator effects are fed in series with the feed liquid and partial concentrates or residual feed, and the heat flux is usually about equal in each effect, and they usually have an equal number of tubes or equal tube surface areas per effect. Flash-down of the feed is then controlled by the available effect-to-effect temperature difference ($\Delta T$) and the tube-side pressure drop in each effect. The effect $\Delta T$ usually ranges from about of 3 to 8° F. at the high temperature end or first effect to about 6 to 16° F. at the low temperature end or last effect; this range is imposed by effect thermal efficiencies (or overall heat transfer coefficients), and by the thermal efficiency in the first effect being about twice that in the last effect.

The use of power plant turbine exhaust steam for evaporation of seawater and power plant wastewater by vertical tube evaporation (VTE) has been reported, for instance in U.S. Pat. No. 5,156,706 which is about the useful application of low temperature waste steam, such as turbine exhaust steam, being available under vacuum. The present disclosure is about producing steam from warmed wastewater or hot brine by flash-down under reduced pressure, and about using such steam for desalination or water purification or wastewater concentration by vertical tube evaporation.

The use of an adjustable orifice plate for the control of feed flow and flash-down thereof as the feed flows into a bundle of vertical evaporation tubes in the down-flow mode, is disclosed in U.S. Pat. No. 5,968,312. A similar or partially similar adjustable orifice plate is applied in the present disclosure for the purpose of controlling upflow feed flow with flash-down and the continued evaporation of the residual feed within a channel with the objective of bringing the vapor and residual feed flows to thermal equilibrium or close thereto during co-current or continuous parallel flow of these phases along the length of such flash-down channels.

SUMMARY OF THE INVENTION

This invention is about the recovery of heat from a warmed or hot liquid by partially vaporizing the liquid by barometric evaporation or in the barometric evaporator while reducing the pressure on the liquid, and by condensing the vapor to produce distilled liquid at a lower temperature, or by partially vaporizing the liquid and making the heat available for use in the form of lower temperature steam or vapor, for example to cause evaporation of another liquid in a vertical tube evaporator. It also includes the recovery of solar heat in a solar pond wherein solar heat is captured in a liquid by heating it, or the recovery of low grade heat including waste heat from sources such as warmed liquids, e.g., such as warmed coolant streams usually flowing into a cooling tower or into a wastewater pond or into the ocean at power plant sites; it is also about a process and apparatus for producing steam or vapor and for applying this energy for evaporation or desalination of saline or waste water including power plant coolants including seawater. Such desalination may also be applied in conjunction with other evaporation developments including recent improvements in the thermal efficiency of desalination by evaporation, e.g. vertical tube foam evaporation (VTFE) reported in U.S. Pat. No. 3,846,254 which permits the use of waste heat for evaporation by substantially increasing the rate of conventional vertical tube evaporation (VTE), and dispersed seeded slurry evaporation (DSSE) as in U.S. Pat. No. 5,156,706 which increases the on-line availability of such evaporators and improves the use of low grade heat or waste heat, and the multi-stack vertical tube evaporator in U.S. Pat. No 5,853,549.

However, after recovering heat as steam or vapor by flash-down of hot brine under a reduced pressure or partial vacuum by this invention, the residual cooled brine typically needs to be pumped out of the evaporator from vacuum (or from low pressure) to a higher pressure or to atmospheric pressure for its disposal or return to the heat source. Such pumping cost could be a substantial if not the dominant portion of the evaporator operating cost. Eliminating or minimizing of such pumping cost is a major additional objective of this barometric evaporator invention, and is achieved by causing the residual liquid to flow under gravity due to or by the adequate elevation being provided, for example by using the vapor produced to raise this liquid and allow or facilitate its out-flow from vacuum under gravity, or to overcome the low pressure or vacuum effect in the barometric evaporator. Provision can be made to cause the distillate to also flow under gravity from, e.g. a horizontal condenser or from a second barometric evaporator by locating them at about 33 feet above the point of release or discharge of the residual liquid or of the distillate. Such discharge of liquids from vacuum without the need of a pump constitutes one of the objectives of the barometric evaporation process.

This process is distinguished from the prior art as a dynamic barometer having two liquid legs or columns, one being an in-flowing liquid column of warmer or hot liquid rising with concurrent evaporation, and the other being a colder out-flowing column and descending. This distinguishes the barometric evaporator from both the barometric condenser which has only a descending liquid column, and from the usual single standing column of a classical barometer which has a mercury column in a glass tube closed at its top and wherein a nearly perfect vacuum forms above the mercury column having a vertical height that measures the atmospheric pressure that sustains the column (i.e. the classical vacuum tube of Torricelli). The known barometric condenser is used for direct-contact condensing of vapor rising against a rain or spray of cooling water is described in the Chemical Engineers' Handbook, Robert H. Perry, McGraw-Hill, Sixth Edition 1984, p.11–41. In the barometric evaporator, a warm or hot liquid flows upward into one leg or conduit as a two-phased liquid-vapor column with continuous flash-down of the residual liquid to a lower temperature and with the vapor formed being used to carry this liquid upward through the column and, after separation from the residual liquid, the vapor is continuously withdrawn from the barometer under vacuum by condensing it under a vacuum. And the cooled residual liquid may then flow out down the other liquid leg as a single-phase liquid column under gravity and without the need of a liquid pump, excepting the vacuum pump. A sufficiently higher temperature is maintained in the in-flowing liquid leg over the out-flowing leg to support continuous flow and evaporation under a vacuum, controlled in part by a continuous withdrawal of vapor and its use as steam, or for the condensation under vacuum of the vapor produced after its separation from the residual liquid in a suitable vessel, and with continuous outflow of the cooled residual liquid under gravity from the vessel. Thus, the barometric evaporator converts a warmed or hot liquid into a colder liquid plus vapor which may be used to recover motive or kinetic energy in a turbine, or may be condensed in a heat exchanger into distilled liquid, and requiring only a vacuum pump and a suitable coolant. In the vertical flash-down mode, the process relies on vapor lift of residual liquid in an upflow flash-down channel to maintain the process flow dynamics and to raise the residual liquid sufficiently for its discharge from the vacuum by gravity. The process may be controlled with an adjustable orifice plate for flash-down initiation, by imposing a sufficient flash-down $\Delta T$ or flash-down pressure drop $\Delta P$ by controlling the level of the orifice plate below the vessel, and/or by selecting the flash-down channel dimensions or the sub-channel dimensions or any thereof, and it is also dependent on the vapor pressure of the liquid and the vapor phase temperature and pressure in the vessel. Another objective of the invention is to reduce or minimize the amount of the waste heat discharged to the environment by converting portion of a wastewater or warmed coolant stream into pure distilled water containing some of that waste heat, and the use thereof for a beneficial purpose such as an industrial need, for example as boiler feed, or to augment the water supply for industrial or municipal use and to reduce the need for drawing on natural water sources. This portion of the waste heat is then used rather than rejected within the wastewater for discharge to the ocean as warmed seawater coolant, or to the atmosphere as vapor from a cooling tower.

Process and Apparatus aspects of the invention

This invention is about imposing one or more process steps on a warmed liquid or brine such as hot solar pond brine, a coolant liquid or hot wastewater or seawater, including:

1. Causing partial vaporization of the warmed liquid stream by flash-down to a lower liquid temperature and pressure responsive to a vacuum or reduced pressure imposed thereon, and forming or producing vapor thereof during up-flow or co-current flow of vapor and residual liquid while transporting the residual liquid co-mingled with vapor flow, but at a lower rate due to slippage or dragging of the denser liquid phase by the accelerating vapor phase, or by lifting the liquid to a higher elevation through a flash-down channel wherein thermal equilibration is gradually approached or imposed between the vapor phase and the residual liquid phase, and to transport these phases into a vapor-liquid separation area or into a vessel wherein separation occurs of the cooled residual liquid phase from the vapor phase produced from the hot liquid;

2. And/or wherein the co-current liquid-vapor flow is controlled by means of measuring and controlling the pressure drop through a flash-down point at the inlet end of two-phase flow channel and/or through a two-phase flow channel, and to provide a controlled vapor release and two-phase flow of residual liquid and vapor into a liquid-vapor separation vessel at an elevation or level that is sufficient to provide for free flow under gravity of the separated residual liquid phase from the vessel via an outlet conduit into the ocean or into a pond or a receiving liquid or to overcome the suction effect of the vacuum or reduced pressure applied inside the vessel. The outlet end of the liquid discharge conduit may be submerged in the ocean or in a selected brine layer inside a solar pond, or it may be submerged in a wastewater pond or other receiving liquid at a point or level of discharge. The objective of discharging residual brine from the vessel and/or of discharging the distillate from a condenser or from another evaporator through such a barometric leg is to save the cost of a liquid discharge pump and its pumping power needs. The vertical dimension of two-phase vapor-liquid lift required depends on the degree of flash-down ($\Delta T$) of the hot feed and on the vapor pressure maintained in the vessel, which is ruled by the temperature of the liquid or brine therein and by the rate of removal of the vapor produced during flash-down. In this type of evaporator, the vapor produced may be continuously removed by its condensation in a condenser or in another evaporator, either of which would be connected to a vacuum pump for the maintenance of a suitable vacuum or reduced pressure, and/or for removal of non condensable gases from the system. A continuous flow of warmed feed liquid into, and of vapor and residual liquid out of the barometric evaporator are thus provided. The upflow stability of the two-phase vapor-liquid stream may be controlled by suitable flash-down control means, e.g. an orifice or orifice plate or an adjustable orifice plate positioned at a suitable elevation below the vessel and by the diameter and length of the two-phase flow channel or sub-channels, and by the vessel height selected to assure an adequate hydrostatic head is maintained at the bottom of the barometric leg for discharge flow of residual liquid from vacuum without a pump;

3. And/or wherein the flash-down of liquid or brine is controlled to initiate flash-down of the warmed or hot liquid at the inlet end of or at a selected point within the flow channel or close to that point so that flash-down occurs as a front or suddenly, or is initiated across the width of the flow channel by a sufficient reduction of the pressure on the liquid at or near that point, and to provide for two-phase vapor-liquid flow to persist beyond or downstream from that point or initiation front, and with further evaporation occurring due to the gradual further pressure gradient or reduction of the pressure and/or temperature imposed on or applied to the two-phase stream of residual liquid and vapor within the channel, with the objectives of further cooling of the residual liquid and of de-superheating the vapor phase, and of reducing their temperature difference or of bringing the vapor and liquid phases closer to their thermal equilibrium and close to the vapor saturation temperature at the outlet end of the two-phase flow channel.

In addition to the above upflow flash-down mode, the barometric evaporator may be alternatively mounted with its sub-divided flash-down channel horizontal for operation in a horizontal flash-down mode, wherein the needed elevation to induce discharge of liquid flows under gravity or without a pump may be provided by elevating the flash-down channel to be about as high as the vapor-liquid separation vessel, both being sufficiently above the level of liquid discharge which usually would be at or below about 33 feet. Several means to improve flow control and flash-down are disclosed, including:

(a) An adjustable orifice plate having one or a multiplicity of adjustable orifices that can intercept the liquid flow into or across the diameter of the flow channel to impose a sufficient pressure drop thereon to initiate flash-down, or to control its flow rate automatically by controlling the pressure on the liquid into or along the length of the flash-down channel, or of several parallel flash-down sub-channels, or as sensed by a pressure sensor or temperature sensor located downstream of the orifice plate, or by two or several such sensors located on either side of the point of flash-down and at the end of the channel or sub-channels to detect or measure pressure change ($\Delta P$) or temperature change ($\Delta T$) during flash-down. Adjustment of the orifice diameters responsive to these measurements would provide one means for controlling the flash-down process or the evaporation rate, and this may be automated to improve the flash-down process stability. The adjustable orifice plate applied herein is as disclosed in U.S. Pat. No 5,968,312. It permits improved flash-down control of a wide range of heated liquid flows to accommodate a wide range of fluctuation in the rate of heat rejection from a power generation plant or another heat supplying process. Additional means for control or adjustment of such flows are the elevation of the orifice plate relevant to the vessel height, the feed pressure or temperature below the orifices, the vapor pressure or temperature in the liquid-vapor separation vessel and the degree of flash-down being controlled. Another orifice controlling procedure is to combine a fixed-orifice plate and the adjustment of a feed control valve upstream thereof albeit not as effective as using the above adjustable orifice plate. Generally, the objective is to maintain or control singlephase liquid flow up to the orifice plate and two-phase thereafter to the vessel;

(b) By the addition of a surface active agent, or a foaming agent or foaming dispersant to the liquid at a selected concentration before it reaches the flash-down point, to stabilize two-phase vapor-liquid flow during liquid flash-down or to improve or maintain the stability of the two-phase flow regime or to prevent coalescing of liquid phase or separation of liquid phase from the two-phase regime within the flash-down channel. Addition of a surface active agent or foaming agent also reduces the liquid holdup and the static pressure within the upflow channel or sub-channels; this also reduces the pressure drop for two-phase flow through such channels, and it also provides for a more intimate or mixed flow by creating foaminess which improves the process of reaching or approaching liquid-vapor thermal equilibration within the channel and also in the separation vessel;

(c) By insertion of a bundle of tubes in-side the flash-down channel, or sub-dividing it, to provide parallel flow sub-channels of selected diameter for the control and maintenance of continuous two-phase flow produced within each sub-channel, by selecting the diameter of the sub-channels, e.g., a close-packed bundle of parallel tubes or pipes packed for example in a tight triangular array, and wherein each tube communicates with an orifice or an adjustable orifice plate to deliver a flashed-down flow of liquid and vapor into each tube or sub-channel, wherein each tube or sub-channel is designed or selected for, or provides for a well dispersed two-phase vapor-liquid flow along its length and for preventing coalescence of liquid phase or back-flow thereof, or to reduce slip-flow thereof, the objective being to bring about or approach thermal equilibrium between the vapor phase and the residual liquid phase at the outlet end of each tube or sub-channel by causing further flash-down of this liquid phase. Means for providing adequate mixing or dispersion of the vapor and liquid phases to promote thermal equilibration also include selecting the diameter and length of the sub-channels, the selection of sub-channel material, construction and flow-channel configuration, for example the use of corrugated plates of fiberglass plastic or metal secured ridge-to-ridge to form parallel sub-channels across the diameter of the channel, or the use of bundles of square pipe or hexagonal pipe having four or six flat sides and packed closely to reduce the overall diameter of the main channel. Also, the option of such pipe being twisted around its axial center to provide for vortex mixing of the two-phase flow along its length or parts thereof. The flow diameter of the flash-down channel or sub-channels depends in part on the feed temperature and the degree of flash-down or the flash-down $\Delta T$ or $\Delta P$ available. In general, the channel diameter would be proportional to the $\Delta P$. The objectives are to improve flash-down efficiency or the thermal efficiency by phase mixing or dispersion, and to approach completion of flash-down, or to obtain a controlled residual liquid temperature and assure that the vapor thereby produced has a temperature close to that of the residual liquid temperature. This objective would also improve thermal efficiency of flash-down. It would also improve the subsequent separation of the residual liquid phase from the vapor phase produced, and the breaking-up of foam to facilitate complete separation of residual liquid before the condensation of vapor in the next step of this procedure. To achieve an improved approach in equilibration of vapor and residual liquid temperatures, or a reduction in their temperature difference, the walls of the packed tube bundles may be indented at selected intervals to promote phase mixing, or mixing elements may be inserted such as helical-twisted baffles similar to U.S. Pat. No. 3,457,982. Such modifications of flow through a tube or channel can be applied to provide for either two-phase flow with mixing of the phases or for phase separation by imposing a single-axial vortex flow whereby the liquid is directed into an annular layer in shear-flow with the vapor in the core of the vortex, or widening the helical insert for dual axial spiral flow to cause phase mixing imposed on the two-phase flow, or an alteration of these modes of flow in sequential channel sections.

4. Separation of the vapor phase, or the nearly saturated vapor, from the residual liquid occurs or is imposed adjacent to the outlet end of the flash-down channel, which liquid is by then cooled by flash-down to a selected or controlled residual liquid temperature or pressure; and this is followed by using or condensing of the vapor phase or the vapor in either a condenser as option one (i.e. in a condensing heat exchanger) or by its condensation in an evaporator as option two (e.g. a condensing and evaporating heat exchanger); in either option condensation occurs under a vacuum or reduced pressure, yielding a distillate. The flash-down vapor thus condensed forms a first distillate having a weight about equal to the weight of the initial vapor produced by flash-down. The amount of this first distillate depends on the selected residual liquid temperature or the degree of flash-down, and on the rate of flow and the temperature of the original liquid or brine or seawater and on whether option one or option two is applied. If option one is applied, this first distillate is the total distillate to be produced and the amount of first distillate is maximal; but it will be lower than the total distillate produced if option two is applied i.e. if condensation of the vapor occurs in an evaporator wherein additional vapor is produced from the residual brine discharged from the barometric evaporator, or from another liquid feed, and if this vapor from the evaporator is also condensed into a second distillate which would increase the total distillate obtained to more than the first distillate.

5. As an option two, the further evaporation of the residual brine discharged from the barometric evaporator or flash-down evaporator may be applied in a vertical tube evaporator (VTE) which can be either an upflow VTE and either a single-effect or multi-effect (ME), or it may be a downflow VTE as for example an evaporator design based in part U.S. Pat. No. 5,853,549 for a multi-stack VTE (or MS-VTE) or it could be a conventional downflow ME-VTE, dependent on the temperature and volume of the available warm feed liquid stream and on the product volume needed. In the option two procedure, the residual liquid or brine discharged from the barometric evaporator may be flashed-down further and then applied as the feed liquid for the VTE or ME-VTE series, to be further evaporated as it flows through the tubes in either downflow or upflow VTE modes and with this evaporation being driven by the heat of condensation provided by condensing the above first vapor on the outside surfaces of these tubes, and so on along the ME series applied. Since the VTE would be at a lower pressure and temperature than the barometric evaporator and depending on their elevations, there may be no need for pumping this feed. The vapor produced in the first VTE amounts to about the weight of the first vapor plus the vapor produced during the further flash-down of the residual liquid from the barometric evaporator, and this amount can be substantially more than the usual amount obtainable from a conventional VTE or ME-VTE since the degree of this further flash-down may be selected independently; also, this further flash-down can be controlled by using the adjustable orifice plate of U.S. Pat. No 5,968,312. The total desalinated product would then include the condensate from the first vapor plus those of the vapors produced in the VTE or VTE series, and would be substantially more than that of option one, and progressively more for additional effects. Several options can thus be applied for the condensation of the vapor produced in the combination of a barometric evaporator and VTE options.

In addition, and especially in examples wherein the warmed, or hot liquid is available at a temperature of say above or about 160° F. (70° C.) as waste heat. The first vapor may be used as heating steam for an evaporator or an upflow VTE wherein the residual brine discharged from the barometric evaporator may be further flashed-down and distributed into the vertical tubes of this evaporator by using an orifice plate or the adjustable orifice plate of U.S. Pat. No. 5,968,312. This procedure provides for a further increase of the total distillate amount produced. This application is also well suited to a desalination procedure which applies a substantially higher temperature difference (ΔT) for vertical tube evaporation (VTE) and a substantially increased ΔT from one VTE to the next in series, and it distinguishes this waste heat driven procedure from a conventional multi-effect VTE series. This high ΔT mode of operation is also distinguished by the increase in product distillate per effect in its series-mode application relative to that of the prior art. Also, its combination with the multi-stack VTE disclosed in U.S. Pat. No. 5,853,549 having an improved design flexibility is well suited to this combination of relatively high ΔT's at relatively low evaporation temperatures; it provides for improved distillate rates while maintaining the relatively high thermal performance as disclosed in U.S. Pat. No. 3,846,254, and as also discussed in some of the examples below.

DESCRIPTION OF THE PREFERRED EMBODIMENTS AND PREFERRED METHOD OF OPERATION

Figure 1:
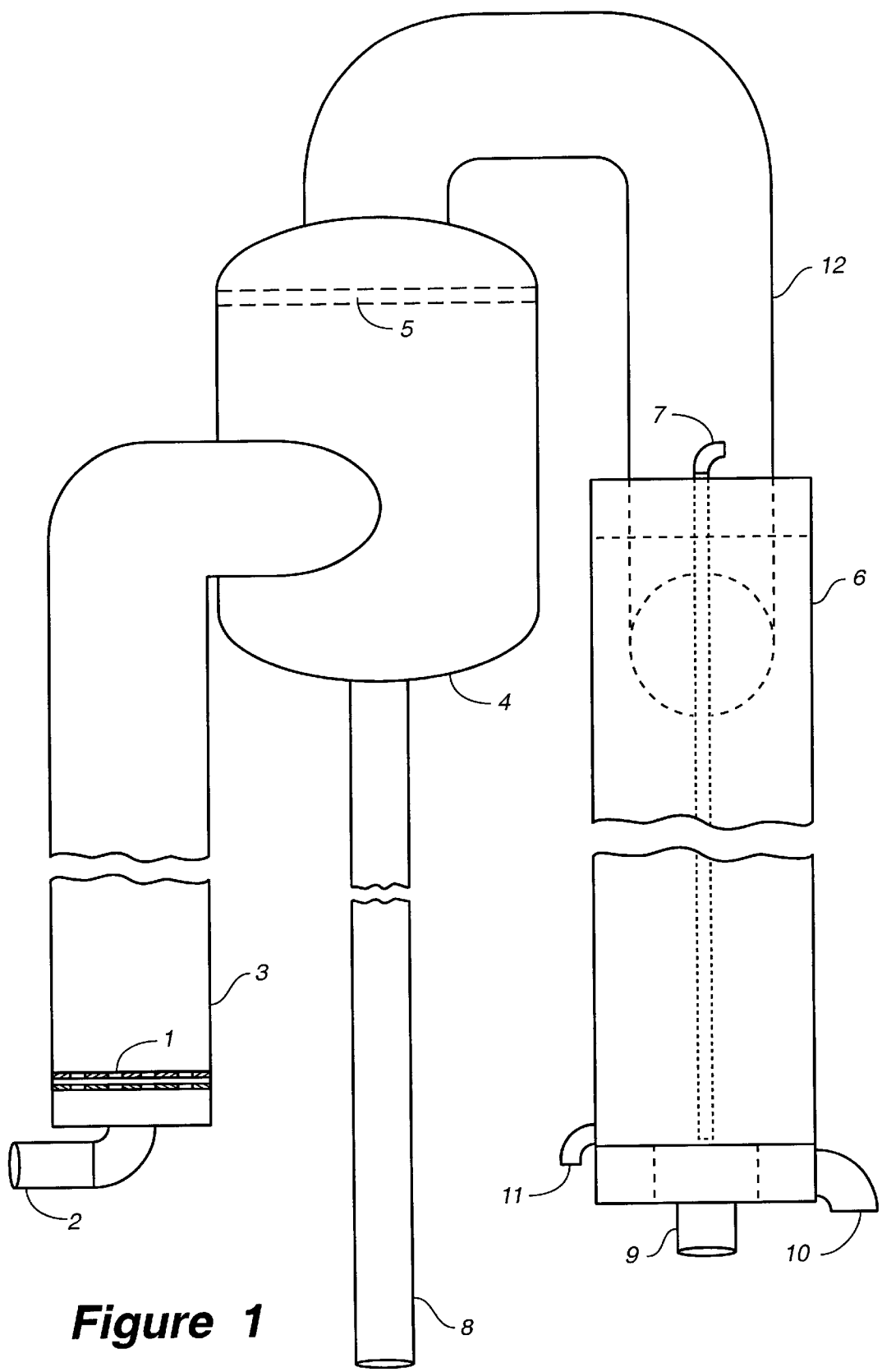
FIG. 1 shows a barometric evaporator having an upflow flash-down channel, a vapor-liquid separation vessel and a condenser to convert vapor into distillate.

In FIG. 1, the barometric evaporator is shown comprising an adjustable orifice plate 1 comprising two parallel plates mounted for sliding one over and against the other and having corresponding orifice holes through them which form the adjustable orifices for controlling distribution and flash-down under vacuum of a warmed or hot liquid feed flowing through a feed inlet 2 into the feed inlet end of an upflow liquid flash-down and evaporation channel 3 wherein further evaporation of the residual liquid phase occurs and upflow vapor-liquid temperature equilibration is induced in part controlled by means of adjusting the orifices in the plate 1 causing the flash-down and distribution of the feed liquid into the channel 3 and whereby the flow control may be affected by the sliding translation of the orifice plates over one another to thereby adjust the flow diameter of the orifices of plate 1 for initiation and control of two-phase liquid/vapor flow as also disclosed in U.S. Pat. No. 5,968,312. In this upflow flash-down mode, the upflow channel 3 is of selected diameter and length and is employed to raise the residual brine sufficiently with the up-flowing vapor phase from flash-down of feed liquid under vacuum to permit later drainage of the residual brine from the separation vessel 4, maintained under a vacuum, by gravity flow alone and without the use of a pump. This adjustable orifice plate 1 also performs the shut-down or partial shutdown function of a valve, to either impede or to control feed liquid flow. The adjustable orifice plate is designed to accommodate a range of feed temperature swings or pressure variations which may be imposed due to changes in the rate of waste heat flow, e.g. due to changes in power demand or power loads or in response to changes due to the weather or operational excursions as well as sudden process changes. Control of the orifice flow diameter and the two-phase flow rate are automatically adjustable responsive to liquid pressure data, flow rate data and/or temperature data upstream and downstream of the orifice plates, and by causing these plates to slide or translate with a hydraulic motor or another power means. Alternatively a manually operated orifice adjusting device may be suitable for some applications, or a single or fixed orifice plate may suffice in steady heat flow applications. One objective is to promote or approach thermal equilibration between the residual liquid phase and the vapor phase produced, or to bring these phases close to an equal temperature at the exit end or vapor/liquid outlet end of the flash-down channel 3 which may be of selected diameter, or may consist of a parallel bundle of flash-down sub-channels of selected diameter sub-dividing the channel 3. Another objective is to maintain the flow or the temperature of the flash-down steam or vapor produced, or to maintain or control its heat content or the superheat level therein. The vapor and liquid phases are subsequently separated in a suitable vessel or in a cyclone type of vapor-liquid separator vessel 4, or with a mist elimination screen 5 to strip liquid phase such as fine droplets from the vapor phase. The vapor may subsequently be used for heating or may be condensed in a suitable condenser 6 to produce desalinated distillate. The condenser 6 may be of the vertical tube type with concentric two-pass coolant flow as indicated, and may, for example use fluted-surface coolant tubes and have its vapor-side (or steam-side) vented with a central perforated vent tube connected by a conduit 7 and to a vacuum pump to maintain the condenser under a vacuum, and have coolant inlet 9 and outlet 10 conduits. Alternatively, the condenser 6 may be mounted horizontally and raised, or the vapor phase conduit 12 may be shortened. A residual liquid outlet conduit 8 discharging at about 33 feet below the vessel 4 would permit liquid discharge without a pump; and a distillate outlet 11 could similarly be drained under gravity from a horizontal condenser or pumped out if needed.

Figure 2:
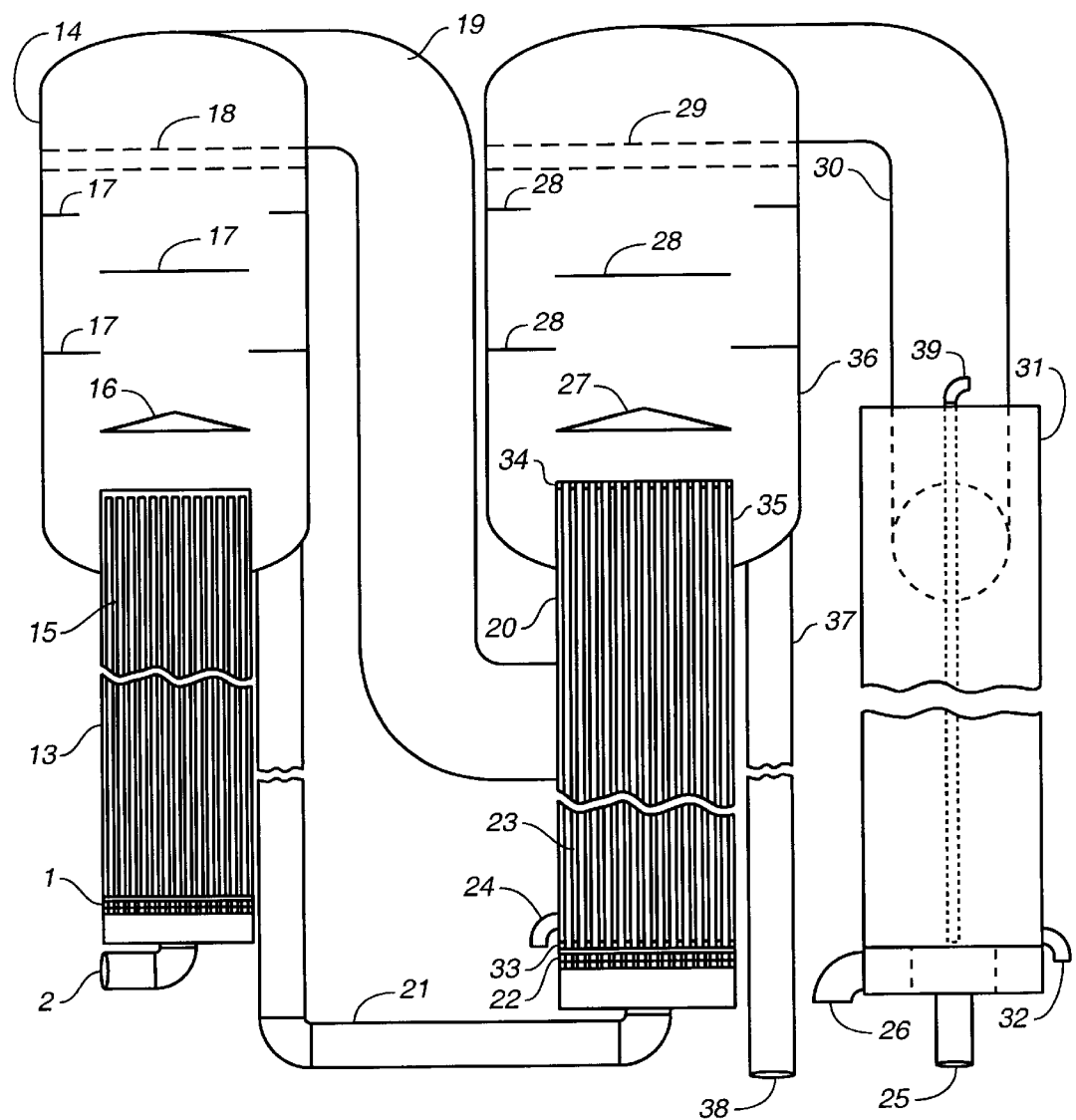
FIG. 2 shows a barometric evaporator having a packed bundle of parallel vertical tubes utilized as a liquid flash-down sub-channels for thermal equilibration of vapor and liquid phases, a vapor-liquid separation vessel, and for condensation of this vapor into distillate an upflow vertical tube evaporator producing additional vapor, followed by the condensation of this additional vapor into more distillate in a final condenser.

FIG. 2 represents one of a series of options to provide for distillate capacity increases over that of the barometric evaporator of FIG. 1, modified by using a multiplicity or a bundle of subdivided upflow flash-down channels, and by adding another evaporator as a condenser or heat exchanger; for example a vertical tube evaporator may be added and operating between the barometric evaporator and its condenser, and by using the vapor initially produced for additional or partial evaporation of the feed liquid or another liquid. An upflow vertical tube evaporator (VTE) as shown in FIG. 2 is preferred for this service, mainly because its residual liquid or blowdown can be raised by upflow to a sufficient elevation to permit this blowdown to drain from vacuum under gravity only or without need of a blowdown pump or a feed pump or their power needs. Also, several such upflow VTE units can be applied in series to further increase the distillate product. Shown in FIG. 2 is a barometric evaporator comprising a liquid feed inlet 2 supplying a warmed or hot liquid to a suitable orifice plate 1 for distribution and flash-down thereof into the inlet end of a vertical channel 13 which is subdivided by the insertion therein of parallel tubular sub-channels 15 of selected diameter for controlling the pressure gradient or pressure drop within these sub-channels 15 and for control of further flash-down of the residual liquid in or during flow along them, or for further flash-down of a feed liquid and for providing two-phase upflow of the vapor phase produced and the residual liquid being further evaporated before discharging them into a vessel 14 wherein the vapor phase is separated from the residual liquid phase by suitable means including a conical splash plate 16, horizontal baffles 17 and a mist elimination device such as a wire mesh screen 18, or any of them. The separated vapor or steam produced flows through a conduit 19 into a vertical tube evaporator (VTE) 20 for condensation therein, producing distillate removable through conduit 24. The separated residual liquid flows under gravity through a conduit 21 into the VTE 20 as feed liquid distributed through an orifice plate 22 or an adjustable orifice plate for further flash down thereof into the bottom inlet ends of a bundle of upflow evaporation tubes wherein further evaporation occurs due to the heat transferred from the first vapor condensing on the outside wall surfaces of these tubes 23 to form first distillate, and in part due to the further flash-down of the residual feed liquid adding to the vapor produced. This vapor and the final residual liquid phase droplets are separated above the upper tube sheet 34 and the VTE tube bundle, for example due to impingement on or deflection by the inverted cone 27 and splash plates 28 or mist elimination screen 29.

In an alternative applicable mode of operation, the channel 13 of FIG. 2 may be horizontal and the adjustable orifices 1 together with the sub-channels 15 would be applied in a horizontal flash-down mode, followed by discharging the two-phase liquid-vapor tangentially into a separation vessel such as 14 which may be vertical cylindrical as in FIG. 2 or a cyclone type as in vessel 4 of FIG. 1. This would for example be advantageous if the feed liquid available is at a sufficient temperature or pressure, or under sufficient pump pressure to elevate the feed liquid and to maintain or exceed saturation pressure on the feed liquid upon entering the vertical orifice plate. The orifice diameters may be selected so as to provide about equal flow across the width of the orifice plate, e.g. the orifice diameters may increase in the vertical direction upward, to offset the lowering of the static liquid head inside the flash-down channel inlet from its bottom to its top side. In this option, the horizontal flash-down channel is preferably subdivided into a multiplicity of smaller channels, sub-channels, or tubes or pipes for instance such as in the bundle of tubes or pipes 15 shown in FIG. 2, each receiving the flash-down flow from one or more of the orifices at their channel inlet ends and wherein the sub-channels have a diameter selected to maintain co-current flow of residual liquid and vapor phases along their length to maintain the mixed phases under a pressure gradient and to promote thermal equilibrium to be reached or approached by the time these phases reach the sub-channel outlet ends. This horizontal two-phase flow may be injected tangentially into the vessel 14 from the sub-channels 15, or may be impinged on or be deflected by a suitable turbine whereby the momentum generated in the flash-down channel or sub-channels may be in part converted into useful power by a power generator. Further separation of the vapor phase from the remaining liquid phase may be achieved by passing it upward over a series of horizontal and annular baffles 17 and through a wire mesh screen 18 into a vapor conduit 19 for condensation in an adjacent condenser as shown in FIG. 1, or in an adjacent evaporator or VTE 20 followed by a condenser 31 as shown in FIG. 2. The alternative separation of vapor and residual liquid phases exiting the channel or sub-channels horizontally may be imposed by their tangential injection into a separation vessel such as e.g. a cyclone separator as shown in FIG. 1, before condensing the vapor in a condenser, or in a VTE followed by a vertical or horizontal condenser as above, or followed by one or more evaporators such as up-flow or down-flow ME-VTE units and the final condenser, to yield additional distillate.

The residual liquid separated from the vapor in vessel 14 would drain through a discharge conduit 21 as feed to the VTE operating at a lower pressure or higher (deeper) vacuum. Also, as an alternative to taking the entire available pressure drop at the adjustable orifice plate 1 the feed liquid may be passed through a valve or a hydraulic turbine located in the feed line 2 ahead of this orifice plate to partially convert feed liquid pressure to useful power. This option could be advantageous if the feed liquid is under pump pressure.

The upflow vertical tube evaporator (VTE) 20 shown would receive residual feed through conduit 21 and vapor or heating steam through conduit 19 from a barometric evaporator.

The feed liquid or brine may be distributed through an orifice plate or an adjustable orifice plate 22 into a bundle of evaporator tubes 23 and heated with the vapor condensing over their outer surfaces to form condensate or distillate collected through a conduit 24 and removable for use with a pump or by gravity flow through a vertical pipe of adequate length to overcome the effect of the vacuum applied. The degree of flash-down of the feed at the orifice plate 22 can be controlled over a desirable range by adjusting the temperature and pressure maintained in the VTE vessel 20 by means of the coolant flow rate applied through conduits 25 and 26, and by condensing the vapor produced in the VTE and by maintaining a vacuum with a suitable vacuum pump connected to conduit 39 which will also remove non-condensable gases from the center of the condenser 31. The vapor produced in the tube bundle 23 may be separated from the residual feed or brine by impingement on a horizontal baffle 27 and/or horizontal annular baffle plates 28 and/or a wire mesh screen 29, and may flow through a vapor conduit 30 into a suitable condenser 31 for condensation into distillate that may be removed through a product conduit 32 with a pump or by gravity through a barometric leg. The condenser 31 shown may be of the vertical fluted tube type having a two-pass coolant flow, but any other suitable condenser would be acceptable, including a horizontally mounted one to allow distillate drainage under gravity from vacuum. The VTE tube bundle 23 may be of smooth walled tubes or of the double fluted type and may be supported by two tube sheets 33 and 34 supported by a cylindrical vessel 35 connected to the vapor-liquid separation vessel 36. The residual liquid is to be removed under gravity from the VTE vessel 36 through a conduit 37 about 33 feet long or, for example having its outlet end 38 submerged in a pond of concentrated liquid or brine or seawater, or a receiving pond or reservoir or the ocean.

Examples of Applying the Barometric Evaporator and Desalination Process (a) Used with a Solar Pond, and the Thermal Energy Applied for Desalination or for Power In a solar pond, a clear brine of selected salinity is usually maintained in each of three layers whereof the bottom layer has the highest salinity and collects or stores heat from solar radiation (insolation) to raise the temperature of this layer to about 180° F. Solar energy concentrated in the bottom layer of brine, which is mixed by internal convection due to the heat absorbed, may be removed or recovered for use in desalination of brine or seawater or agricultural wastewater by utilizing the hot brine as feed in a barometric evaporator. In this application, the barometric evaporator is maintained under vacuum and draws feed by suction from the lower, hot brine layer. Heat is recovered from this feed by its flash-down to produce vapor, and the residual brine is returned by gravity flow through a hydraulic leg or a residual brine column, without the need for a brine pump, and into the pond bottom layer for re-heating by solar radiation. The vapor produced may be condensed in a suitable condenser or an evaporator to produce distillate. In this application, a volume of brine or a wastewater or seawater of about equal the volume as the distillate may be added to the bottom layer of the pond as makeup to maintain its volume or level, while its salinity is controlled by rejection of brine concentrate as needed, to maintain its total salt content at or below a suitable or selected maximum. In this application, the solar pond and the barometric evaporator can also be used to dispose of a wastewater or to desalinate seawater while producing useful distillate. For example, agricultural wastewater may be softened by removal of calcium and magnesium ions therefrom by ion exchange, the softened feed may then be used as the coolant in a cooling tower recycled through a condenser to convert vapor from the evaporators into distillate. The cooling tower would partially concentrate this wastewater feed, and the blowdown from the cooling tower may be used as feed for the evaporator (VTE) producing distillate and a brine concentrate suitable as makeup to the solar pond bottom layer. Some of this brine and brine concentrate rejected from the pond bottom layer to maintain its salinity level may be used to regenerate the ion exchange resin used to soften the original saline water or agricultural wastewater feed, as also known from the literature.

b. Use of this Process Sequence with a Specific Solar Pond

In this example, about 1000 gallons per minute of brine is withdrawn with a perforated pipe submerged along one end of the hot bottom layer of a 3-acre solar pond and flashed down under a vacuum from 170° F. to 130° F. to generate about 327 pounds/min of nearly-saturated vapor (or steam) in a barometric evaporator under vacuum, and the residual brine flows under gravity into the opposite end of the same bottom layer of the pond and is distributed through another perforated submerged pipe. The vapor produced may be condensed in a condenser cooled with softened feed brine circulated through the condenser and a cooling tower, to produce about 39 gallons per minute (GPM) of distilled water which can be pumped out for use. Alternatively, the vapor produced by flash-down of 1000 GPM of brine from 170° F. to about 140° F. is used as steam condensed at about 248 pounds/min (29.74 GPM) in a vertical tube evaporator (VTE) wherein softened blowdown brine coolant from the cooling tower is circulated for the further concentration thereof in the VTE while a second vapor stream of about 248 pounds per minute of vapor is generated at about 130° F. and is condensed into distillate at about 29.74 GPM in the condenser. A total of about 59.5 GPM of distillate is thus produced, while two different brine streams are partially concentrated, and the distillate production is increased by about 50% while reducing the solar heat utilized by about 25%.

(c) Use for Seawater Desalination with Power Plant Waste Heat in Several Modes (1) In another example, a pebble bed type of nuclear reactor driving a gas turbine to power a generator of about 100 MW electric power at about 33% overall efficiency, provides about 200 MW of waste heat which is rejected to seawater coolant at about 80° F. to raise its temperature to about 180° F.; and this heated coolant is applied as the feed for the barometric evaporator and for desalination of seawater. This warmed seawater would flow at about 13,600 gallons per minute (GPM) and when flashed down in the barometric evaporator to 100° F. releases vapor at a rate of about 8755 pounds/min. This vapor may be condensed as in FIG. 1 to produce about 1050 GPM of distillate, or about 1.5 million gallons per day (MGD) of distilled water. Alternatively, less flash-down of the 13,600 GPM of warmed seawater in a barometric evaporator may be elected, and be followed by further flash-down thereof in one or more VTE units operated in a series that are heated with vapors produced from the seawater by either or both feed flash-down and its further evaporation by VTE as also outlined above in FIG. 2, for example:

(2) Flash-down of the seawater coolant from 180 to 120° F. would produce about 6630 pounds/min of vapor which is then condensed in one VTE unit and converting it to 795 GPM of first distillate while generating about an equal weight of vapor from the residual brine discharged from the barometric evaporator at 12,805 GPM and used as feed in the VTE after being further flashed down from 120 to 100° F. with the generation of about 2060 pounds/min of flash-down vapor, for a total of 8690 pounds of vapor to be condensed in the condenser to 1042 GPM. Total distillate produced in this option is 15,320 pounds/min or about 2.646 MGD of distillate.

(3) Alternatively, flash-down of the seawater coolant from 180° F. to 150° F. would produce about 3374.5 pounds/min of vapor which is then condensed in the first VTE to convert it into 404.7 GPM of first distillate. It also evaporates 404.7 GPM from the residual brine, which is added to the vapor from flash-down of the 13,200 GPM of residual brine feed from 150 to 140° F. at 129 GPM all of which would condense in the second VTE to 404.7+ 129=533.7 GPM of second distillate. And this would evaporate 533.7 GPM of feed in the second VTE to which feed flash-down from 140 to 130° F. would add 128 GPM for a total of 661.7 GPM of third distillate. Vapor generated in the third VTE would amount to 661.7 plus 126.1 GPM from flash-down of the feed which would condense to 787.8 GPM of final distillate. The total distillate from one barometric evaporator followed by three VTE effects would then be about 2387.9 GPM, or about 3.439 MGD of distillate product.

d. Use for Supplying Boiler Feed Water at a Conventional Thermal Power Plant

In this example, a barometric evaporator is used to supply distilled water to be used as boiler feed for a power plant by evaporation of a portion of its warmed circuit water or coolant under vacuum and by condensing the vapor produced in a condenser cooled by cold circuit water, e.g. in an automated mode of operation. For example, to generate 25,000 gallon per day of boiler feed water, about 2500 gallons per minute of warmed coolant water is flashed down through about 7.5 °F. in a barometric evaporator such as shown in FIG. 1 or in FIG. 2, and the vapor produced at about 148.8 pounds/min is condensed in a condenser cooled with cold coolant circuit water split from the power plant pumped coolant, to produce about 25,700 gallons/day of distilled water for plant or boiler feed use.

(e) In another example, waste heat absorbed by the coolant recycled to an internal combustion engine, e.g. the coolant of a large diesel engine for generating electric power being cooled with recycled water or another liquid coolant, the barometric evaporator can be used to recover waste heat from the cooling cycle to generate steam under vacuum or low pressure. The steam generated may then be used to drive a vertical tube evaporator for desalination of seawater or wastewater. In this example, a stream of diesel engine coolant at about 215° F. is used as feed into the barometric evaporator of FIG. 2, and flashed down to generate vapor or steam at about 190° F., or at another selected temperature, while the cooled-down residual coolant is returned to the diesel engine jacket to absorb more heat, and the steam released under partial vacuum may be condensed in an upflow VTE wherein an impure feed or saline water is distilled under vacuum to yield vapor, and the condensed steam may be returned to the diesel engine coolant to maintain its salinity or consistency; alternatively it may be used as distillate while another impure or saline water is added as makeup for the diesel coolant, subject to occasional blowdown from the coolant to maintain its salinity or consistency within acceptable limits. The vapor may alternatively be condensed, for example in an air-cooled condenser or another suitable heat exchanger, to produce useful distillate.

What is claimed is:

1. In a barometric evaporation process for flash-down evaporation of a warmed liquid by reducing the pressure thereon and generating vapor while reducing the temperature of said liquid, the improvement comprising:

(a) Flowing said liquid through a multiplicity of orifices in parallel array at a selected point within a flash-down channel for flow throught said channel;

(b) said orifices having a diameter adjustment for controlling a pressure drop on said liquid initiating said flash-down of said liquid to produce two-phase flow consisting of vapor from said liquid and residual liquid;

(c) imposing a pressure gradient on said two-phase flow within said channel and causing further of said flash-down evaporation of said residual liquid while raising said residual liquid to a higher elevation;

(d) separating said residual liquid and said vapor adjacent to an outlet end of said channel, and condensing said separated vapor to produce distillate of said vapor;

(e) and wherein said raising of said residual liquid to said higher elevation provides an elevation sufficient for the discharge of said residual liquid from reduced pressure to a higher pressure without a pump but by gravity induced flow of said separated residual liquid.

2. The process of claim 1 wherein said channel comprises a multiplicity of parallel channels for parallel flow communicating with said multiplicity of orifices and having selected dimensions for imposing said pressure gradient on said two-phase flow within said channels and providing for thermal equilibration between the phases of said two-phase flow being approached at said outlet of said multiplicity of channels.

3. The process of claim 1 wherein a surface active agent is added to said liquid to stabilize said two-phase flow and to improve said further evaporation of said residual liquid and improving thermal equilibration between said vapor and residual liquid phases.

4. The process of claim 1 wherein said multiplicity of orifices are used with the adjustment of a feed control valve upstream thereof for controlling flow of said warmer liquid.

5. The process of claim 1 wherein said vapor flow are passed through a turbine, for generating power.

6. In a barometric evaporation process for flash-down evaporation of warmer saline water by reducing the pressure thereon and generating vapor while reducing the temperature of said saline water, the improvement comprising:

(a) Flowing said saline water through a multiplicity of orifices in parallel array into an inlet end of a flash-down channel;

(b) said orifices imposing a pressure drop on said saline water initiating said flash-down of said saline water to produce two-phase flow consisting of vapor from said saline water and residual saline water;

(c) imposing a pressure gradient on said two-phase flow within said channel and causing further flash-down evaporation of said residual saline water while raising said residual saline water to a higher elevation by vapor lift;

(d) separating said residual saline water from said vapor adjacent to an outlet end of said channel, and (e) condensing said vapor to produce distillate from said vapor;

(f) and wherein said raising of said residual saline water provides for the discharge of said separated residual saline water from said reduced pressure to a higher pressure without a pump but under gravity induced flow reducing pumping cost.

7. The process of claim 6 wherein said channel comprises a multiplicity of parallel sub-channels communicating with said multiplicity of orifices and having selected dimensions for imposing said pressure gradient on said two-phase flow within said sub-channels and providing for thermal equilibration of said two-phase-flow to be approached at said outlet end of said multiplicity of sub-channels.

* * * * *